United States Patent [19]

Pollard et al.

[11] Patent Number: 5,511,486
[45] Date of Patent: Apr. 30, 1996

[54] SHOCK ABSORBING TOW BAR

[75] Inventors: Mark A. Pollard, Plattsburg; Wendy L. Calvert, Blue Springs, both of Mo.

[73] Assignee: LICO, Inc., Kansas City, Mo.

[21] Appl. No.: 307,525

[22] Filed: Sep. 16, 1994

[51] Int. Cl.⁶ .................................................. B65G 17/00
[52] U.S. Cl. .......................... 104/172.3; 213/1 R; 213/7; 213/62 R
[58] Field of Search ........................ 104/162, 172.2, 104/172.3, 172.4; 213/62 R, 64, 66, 69, 221, 7, 1 R; 267/196, 201; 188/129, 67, 268, 322.12, 381; 198/343.2; 293/136

[56] References Cited

U.S. PATENT DOCUMENTS

| | | | |
|---|---|---|---|
| 3,053,526 | 9/1962 | Kendall | 267/201 |
| 3,190,592 | 6/1965 | Grizzle, Jr. | |
| 3,232,597 | 2/1966 | Gaydecki | 188/268 |
| 3,583,530 | 6/1971 | De Venne | 188/268 |
| 3,720,172 | 3/1973 | Dehne | |
| 3,804,446 | 4/1974 | Warrener | 188/268 |
| 3,830,347 | 8/1974 | Fader et al. | 188/322.12 |
| 3,926,125 | 12/1975 | Orwin | |
| 5,027,715 | 7/1991 | Moore et al. | |
| 5,067,414 | 11/1991 | Moore et al. | |
| 5,183,137 | 2/1993 | Siwek et al. | 188/129 |

FOREIGN PATENT DOCUMENTS

| | | | |
|---|---|---|---|
| 70249 | 3/1959 | France | 267/201 |
| 630137 | 10/1978 | U.S.S.R. | 104/172 S |

*Primary Examiner*—Mark T. Le
*Attorney, Agent, or Firm*—Chase & Yakimo

[57] ABSTRACT

The trailing, load supporting component of a product conveyor is connected to a powered, leading component by a shock absorbing tow bar that employs a dampener tube in which a plunger moves against the resistance of a sleeve of resilient material. The head of the plunger is oversized with respect to a passageway defined by the sleeve and thus is forced to compress and displace the resilient material in order to move relative to the passageway in response to an impact caused by rapid acceleration or deceleration of the conveyor. Compression and displacement of the material occurs at a zone of contact of the head with the material, the head shifting the zone of contact and compressing and displacing the material in response to the impact communicated to the tow bar. A protective sleeve shields an exposed plunger rod from contaminants and enhances the structural integrity of the assembly.

16 Claims, 5 Drawing Sheets

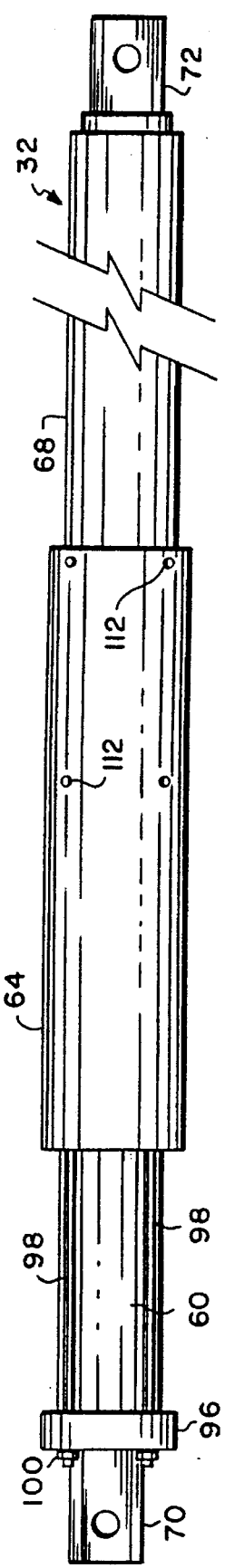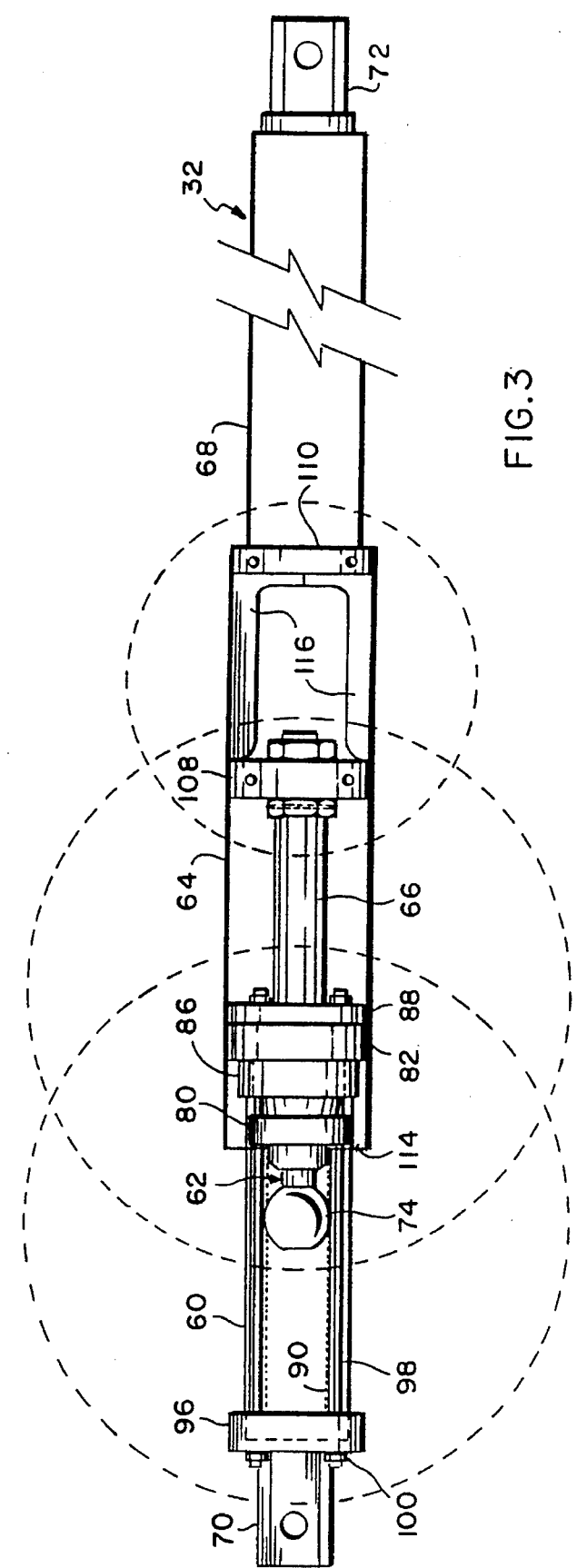

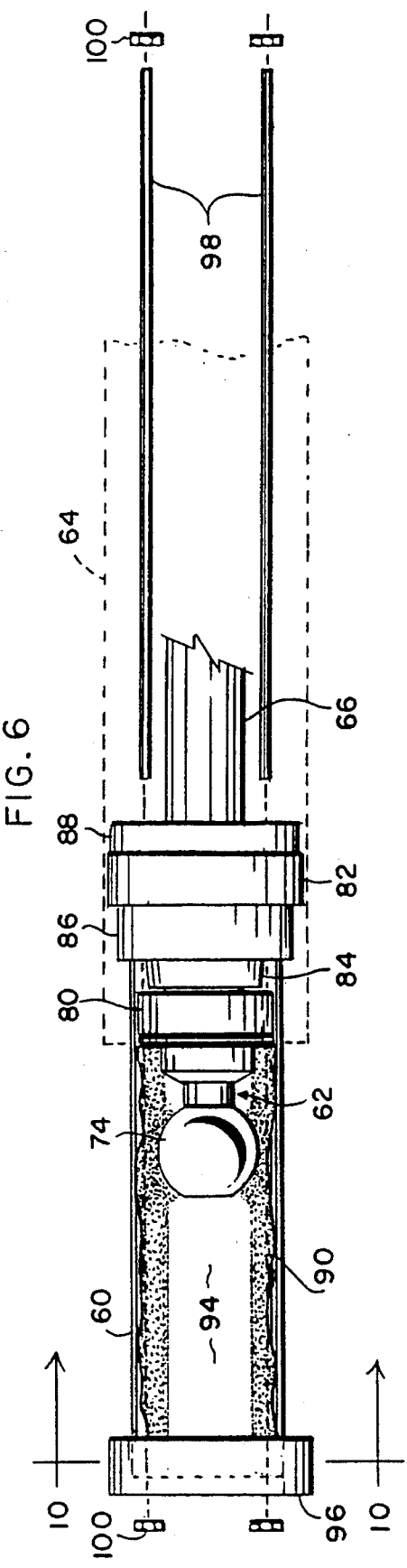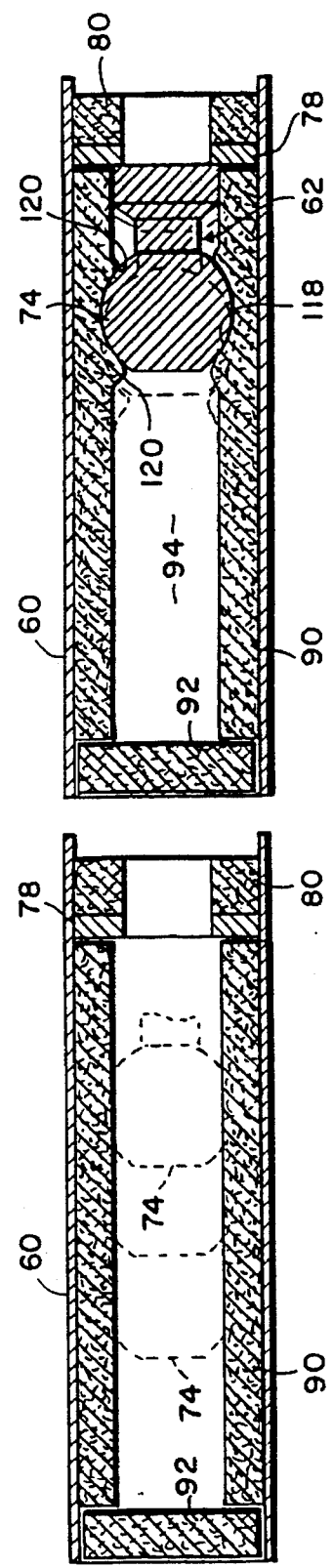

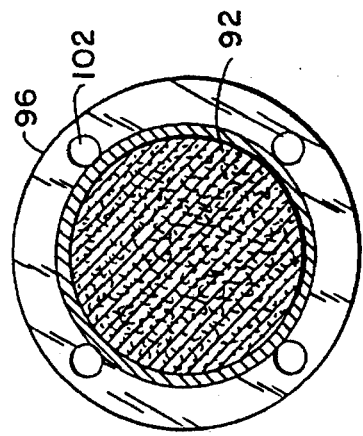
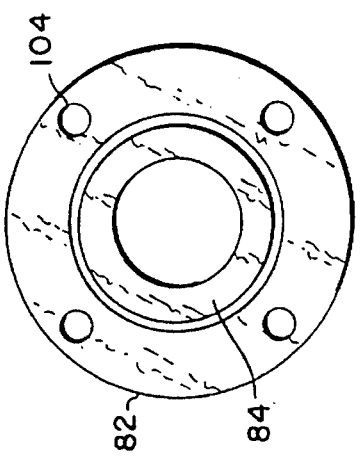
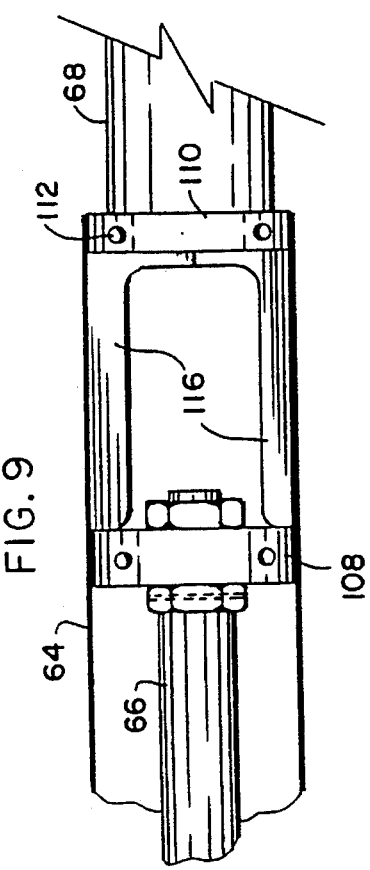
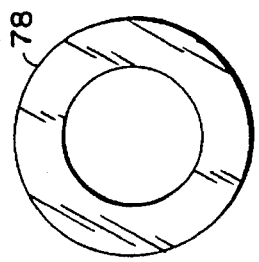
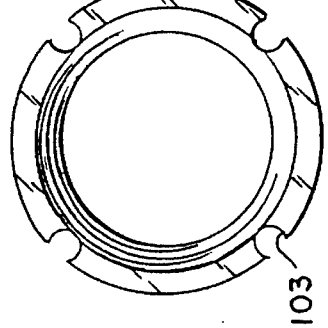
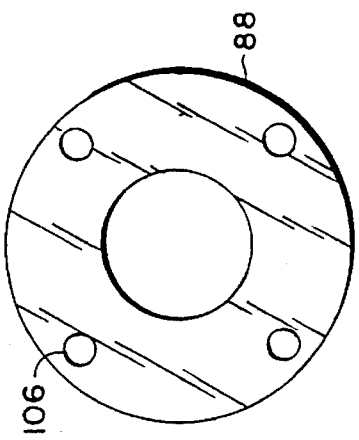

SHOCK ABSORBING TOW BAR

BACKGROUND OF THE INVENTION

This invention relates to improvements in tow bars for product conveyor systems and, in particular, to a shock-absorbing tow bar for coupling a load-supporting carrier to a powered component of the movable conveyor.

Industrial conveyor systems, including those of the power and free type disclosed herein, typically utilize tow bars between the powered component of the moving conveyor and one or more trailing, load-supporting carriers. Referring particularly to power and free conveyor systems, the powered component is the accumulating trolley on the free track and, when driven, is engaged by a pusher dog projecting from the conveyor chain on the power track. The accumulating trolley is the lead trolley and is connected to a trailing load trolley (or trollies) with a tow bar. Due to the rigidity of the trolley train and carrier assembly, the impact of a pusher dog engaging the accumulating trolley, or the impact of the accumulating trolley striking a stop, is imparted directly to the carrier under tow and may cause the load to shift, damage to the product, or excessive fatigue and wear on the components of the conveyor system.

To alleviate this excessive shock loading, a shock-absorbing link between the driven and towed components of industrial conveyor systems is highly desirable in order to provide a means of controlling the rapid acceleration and deceleration inherent in normal operation of the systems. One such device is an air-type shock absorber utilizing a piston that operates in a pneumatic chamber, an orifice through the piston permitting movement thereof only at a controlled rate. Also, similar devices have been employed of the hydraulic type and have the advantage of improved control due to the incompressibility of hydraulic fluid. An example of the air-type shock absorber is shown and described in U.S. Pat. No. 3,720,172 to Clarence A. Dehne, issued Mar. 13, 1973.

Furthermore, as the hydraulic-type shock absorber is subject to eventual leakage problems which render it totally inoperable and can cause contamination of the plant area occupied by the conveyor, a shock absorber utilizing metallic balls has been employed in an attempt to avoid the disadvantages of air and hydraulic-type shock absorbers. Such a metallic ball device is disclosed in U.S. Pat. No. 5,027,715 to Archie S. Moore et al, issued Jul. 2, 1991 where particulate damping material such as a quantity of ball bearings is positioned in a damping chamber. Acceleration and deceleration cause the bearings to be drawn past a piston through an annular space between the piston and the surrounding wall of the damping chamber. As the bearings become crowded on one side of the piston or the other, the resistance to movement increases. A disadvantage, however, is that over a period of time the piston abrades the surfaces of the balls and can cause them to fracture, thus their ability to roll lessens and the shock absorbing ability is degraded.

SUMMARY OF THE INVENTION

It is, therefore, the primary object of the present invention to provide a tow bar for a product conveyor which controls acceleration and deceleration and absorbs the shock that would otherwise be applied to the conveyor and the product, but accomplishes these results without the use of hydraulic fluid or parts requiring close machining tolerances.

As a corollary to the foregoing object, it is an important aim of this invention to provide a tow bar in which only two parts undergo relative movement, i.e., a plunger that encounters resistance to movement due to contact with a stationary resilient material.

Another important object is to provide a tow bar as aforesaid that employs a resilient material defining a passageway in which the plunger moves, wherein the plunger has a head that is oversized with respect to the passageway to create an interference fit and thus compresses and displaces the resilient material in order to move relative to the passageway in response to impact caused by rapid acceleration or deceleration.

Still another important object is to provide such a tow bar in which a sleeve of resilient material and a plunger head within the sleeve provide resistance to sudden and rapid relative movement of the two components.

Yet another important object of this invention is to provide such a tow bar having the aforesaid sleeve and plunger components in which the head of the plunger compresses and displaces the resilient material at a zone of contact therewith, the head shifting the zone of contact and compressing and displacing the material in response to relative movement of the plunger and resilient sleeve under an impact that is communicated to the tow bar.

Yet another important object of the invention is to provide a tow bar construction of this type having an outer, protective sleeve which shields the movable plunger against contaminants and enhances the structural integrity of the tow bar assembly.

Other objects will become apparent as the detailed description proceeds.

DESCRIPTION OF THE DRAWINGS

FIG. 2 is a plan view of the tow bar alone.

FIG. 3 is a view of the tow bar of FIG. 2 with parts broken away to reveal major components and details of construction.

FIG. 6 is an enlargement of the portion of FIG. 3 within the left broken line circle, with certain parts exploded for clarity.

FIG. 7 is a detail in longitudinal cross-section of the dampener tube showing successive positions of the plunger head in broken lines.

FIG. 8 is a fragmentary view similar to FIG. 7 but shows the plunger head and the deformation of the resilient sleeve material at a zone of contact with the head.

FIG. 9 is an enlargement of the portion of FIG. 3 within the right broken line circle.

FIG. 10 is a transverse, cross-sectional view taken along line 10—10 of FIG. 6.

FIG. 11 is an end view of an end washer on the plunger rod within the protective sleeve.

FIG. 12 is an end view of a washer in the dampener tube seen in FIGS. 7 and 8.

FIG. 13 is a detail of the end cap at the right end of the dampener tube taken along line 13—13 of FIG. 4 and looking in the direction of the arrows.

FIG. 14 is a left end view of the plastic bushing on the plunger rod taken along line 13—13 of FIG. 4 and looking in the direction of the arrows.

DETAILED DESCRIPTION

Figure 1:
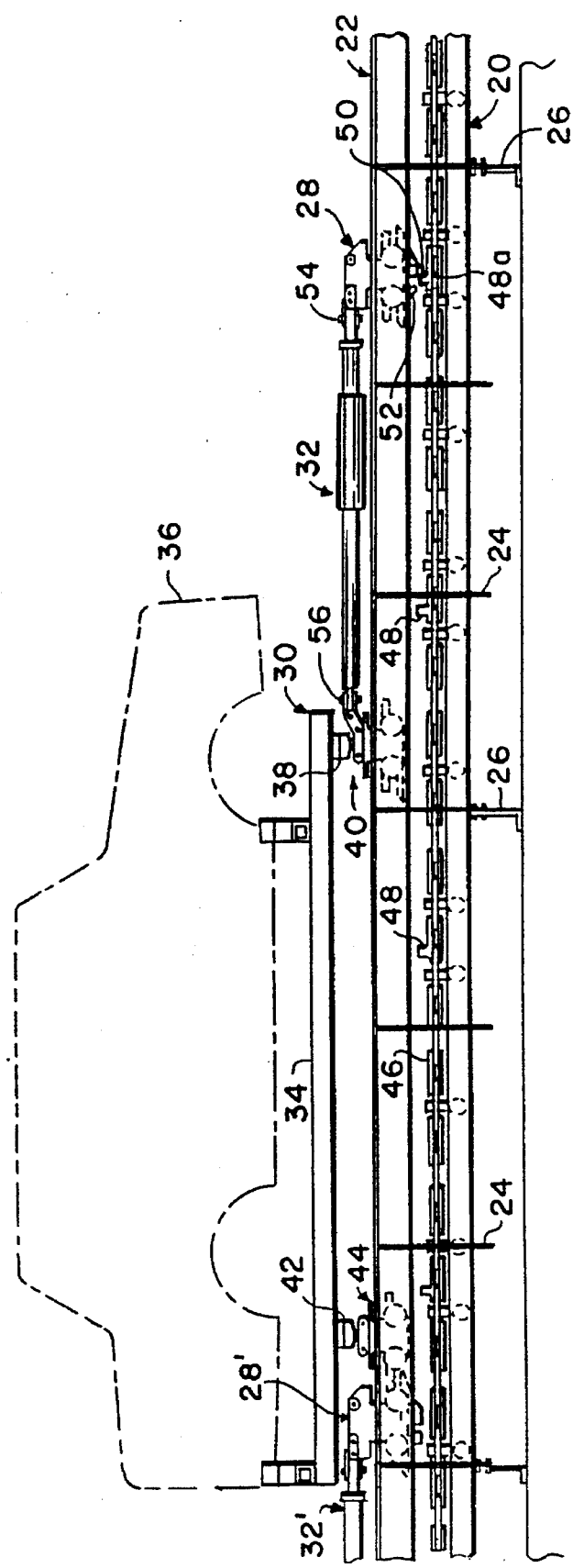
FIG. 1 is a fragmentary, side elevational view of an inverted power and free conveyor system showing a carrier joined to a powered trolley by the tow bar of the present invention.
Figure 5:
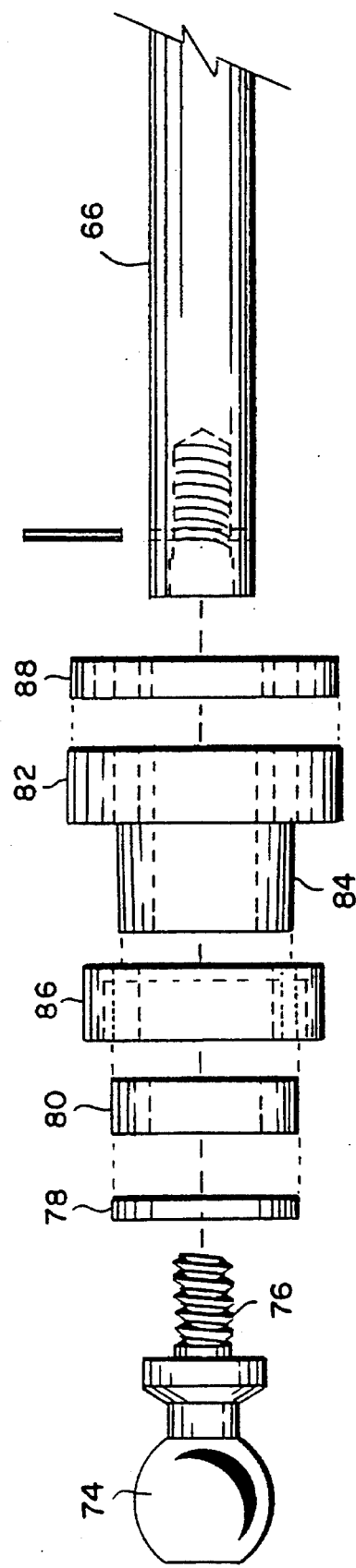
FIG. 5 is an exploded view of the components seen in FIG. 4.

FIG. 1 illustrates a portion of an inverted power and free conveyor system having the usual power track 20 disposed below and extending in parallelism with the free track 22. The tracks are rigidly interconnected by longitudinally spaced yoke plates 24 secured to a floor or other horizontal surface at spaced locations 26 along the span of the system. Typically, each of the tracks 20 and 22 is formed by a pair of spaced, opposed channel members within which the trolley rollers ride.

The trolley train shown in FIG. 1 has a leading (accumulating) trolley 28 to which a carrier 30 is connected by a tow bar 32. The carrier 30 includes a platform 34 which bears a product under assembly on a production line, such as an automobile illustrated at 36. The platform 34 is supported by a front pedestal 38 borne by an intermediate load trolley 40, and a rear pedestal 42 carried by a trailing load trolley 44. During movement, the leading trolley 28 is powered by a conveyor chain 46 on spaced power trollies which ride in the power track 20. As is conventional, the conveyor chain 46 is provided with spaced, upwardly projecting pusher dogs 48, each engageable with a driving dog 50 depending from the lead trolley 28 of each train and spaced forwardly from a holdback dog 52. One of the pusher dogs is designated 48a for clarity and is shown in engagement with the driving dog 50 of trolley 28 of the train illustrated in FIG. 1. The front and rear ends of the tow bar 32 are connected to the leading trolley 28 and the intermediate trolley 40 by clevis and pin connections 54 and 56 respectively.

The tow bar 32 of the present invention is shown in detail in FIGS. 2–14. Major components of the tow bar 32 are shown in FIGS. 2 and 3 and comprise a cylindrical dampener tube 60, a plunger generally denoted 62 (FIG. 3), a protective sleeve 64 secured to the plunger rod 66, and a tubular link 68 extending coaxially from the right end of sleeve 64. A lug 70 projecting from the left end of dampener tube 60 (as viewed in FIGS. 2 and 3) presents the front end of the tow bar 32 that is attached to the leading trolley 28 at connection 54 (FIG. 1). Similarly, a lug 72 projecting from the outer end of link 68 presents the rear end of tow bar 32 that is connected to the intermediate trolley 40 at 56.

Referring also to FIGS. 4–8, it may be appreciated that the plunger 62 has a generally spherical head 74 on a threaded shank 76 (FIGS. 4 and 5) which secures the head 74 to the plunger rod 66. As is particularly clear in FIGS. 4 and 5, a number of parts fit over the plunger rod 66 including a metal washer 78, an annular compression block 80 preferably composed of SHORE A50 urethane, a plastic bushing 82 having a frusto-conical portion 84, an end cap 86 which fits over the right end of dampener tube 60 (FIG. 6), and an end washer 88.

The dampener tube 60 has a sleeve 90 of resilient material therein as best seen in FIGS. 6–8, the sleeve 90 being of uniform, normal wall thickness and terminating at its right end at the washer 78, the latter and compression block 80 being received within the right end of tube 60. A similar solid compression block 92 is fitted into tube 60 at the left end thereof and abuts sleeve 90. FIG. 7 shows the uncompressed radial thickness and uniform inside diameter of the sleeve 90 absent the presence of the plunger head 74 to be discussed. The material forming sleeve 90 may comprise a urethane having a SHORE rating in the range of from A80 to A90 or other material with similar elasticity. The urethane material is highly elastic, tear resistant and has no memory.

FIGS. 6 and 8 show the head 74 received within the cylindrical longitudinal passage 94 presented by the resilient sleeve 90. The broken line illustrations of head 74 in FIG. 7 indicate that head 74 and dampener tube 60 are movable relative to each other longitudinally (axially) of tube 60, such movement occurring in response to rapid acceleration or deceleration of the conveyor as will be discussed in detail below. It should be understood that the resilient sleeve 90 is molded in place within the dampener tube 60 and that, therefore, the complimentary, cylindrical internal and peripheral surfaces of tube 60 and sleeve 90 are bonded together. Accordingly, sleeve 90 is stationary with respect to dampener tube 60. The plunger head 74 in FIGS. 6 and 8 is shown at nearly the right hand limit of its movement relative to tube 60 in passage 94.

Assembly of the plunger 62 and the dampener sleeve 60 may be appreciated from viewing FIGS. 3–6 collectively. An end cap 96 is fitted over the left end of tube 60 and is held by four tie rods 98 and associated nuts 100, two of the tie rods 98 being visible in FIGS. 3 and 6. The tie rods 98 extend through holes 102 in end cap 96 (FIG. 10) and through corresponding notches 103 in end cap 86 (FIG. 13). Furthermore, the tie rods 98 extend through apertures 104 and 106 in bushing 82 and end washer 88 respectively (FIGS. 11 and 14). The nuts 100 on the threaded ends of the four tie rods 98 are tightened against end cap 96 and end washer 88 to clamp the assembled parts together, except for plunger rod 66 which remains free to move longitudinally with respect to the dampener tube 60.

Figure 4:
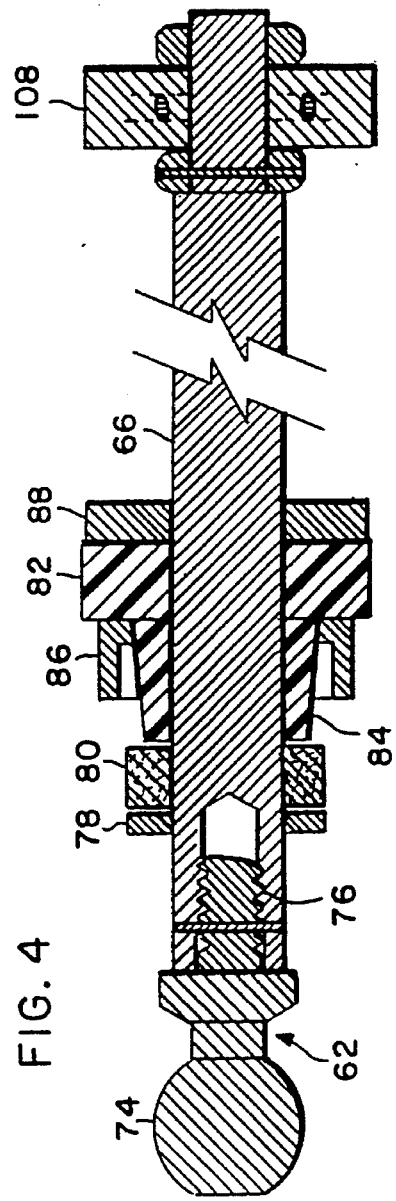
FIG. 4 is a detail of the plunger and associated components in longitudinal cross-section located within the middle broken line circle in FIG. 3, and on an enlarged scale as compared with FIG. 3.

A spacer disk 108 is affixed to the outer end of the plunger rod 66, which is the right end thereof as viewed in FIGS. 3 and 4. A disk 110 of the same diameter is disposed in coaxial relationship with plunger rod 66 and disk 108 and is spaced therefrom as shown in FIGS. 3 and 9. The protective sleeve 64 is telescoped over these parts and is secured to the spaced disks 108 and 110 by screws or other suitable fasteners 112. The protective sleeve 64 spans the disks 108 and 110 and extends forwardly (to the left in FIG. 3) to its front end 114 which is just behind the plunger head 74. The sleeve 64, therefore, moves with the plunger 62 and is in sliding contact with the outer surface of bushing 82. When the tow bar 32 is extended fully as shown in FIGS. 2 and 3, the sleeve 64 and supporting bushing 62 provide an external support for the device as well as providing a protective cover to keep the plunger rod 66 free of contaminants. With particular reference to FIGS. 4 and 14, it should also be noted that the plunger rod 66 is supported in a guide provided by the cylindrical internal surface of bushing 82 and its frusto-conical projection 84.

Extension of the tow bar 32 to the necessary length to reach from the leading trolley 28 to the intermediate trolley 40 in FIG. 1 is accomplished by the tubular link 68 which may be cut to a length that is appropriate. The forward end of link 68 is secured to the disk 110 (FIG. 9) which is held by the sleeve 64 and, additionally, by a pair of angle members 116 interposed between the disks 108 and 110.

Operation

As shown in FIGS. 6 and 8, the diameter of the plunger head 74 is greater than the inside diameter of the passage 94 and thus an interference fit is created. This causes the head 74 to compress sleeve 90 at an annular zone of contact 118 surrounding the ball-like head 74. As the material of sleeve 90 is compressed by head 74, it is also displaced as indicated by the longitudinally spaced, radially inwardly projecting annular ridges 120 formed by the displaced material. When the head 74 is caused to move relative to the passage 94 as indicated by the broken lines in FIGS. 7 and 8 in response to rapid acceleration or deceleration of the conveyor, the zone of contact 118 shifts with the head to create resistance to its movement. For relative movement to occur, the material of sleeve 90 must be progressively compressed and displaced at the moving zone of contact 118. The leading and following ridges 120 further add to the resistance encountered. An effective shock-absorbing action is thereby provided, and the ridges of displaced material 120 serve to stop the head 74 and hold it at the position to which it shifts in response to an applied impact.

The dampener tube 60 is protected against damage in the event of an over-travel situation by the end stops presented by resilient blocks 80 and 92. The full lines in FIG. 8 are an example of over travel to the right as the base of the plunger 62 is in contact with washer 78, the latter being interposed between plunger 62 and the compression block 80. Any further movement of head 74 to the right would result in compression of the urethane material of block 80. Likewise, extreme travel to the left end of dampener tube 60 (as viewed in FIGS. 6–8) would be absorbed by the end stop provided by urethane block 92.

In summary, relative movement of plunger head 74 in the resilient sleeve 90 requires that the resistance presented by the zone of contact 118 be overcome, and thus energy is absorbed in the course of moving the head 74 from an initial to a final, rest position. This absorption of the energy of impact isolates the carrier 30 in FIG. 1 from sudden, high forces that would otherwise be applied to the carrier by rapid acceleration or deceleration. It should be appreciated that rapid acceleration occurs when a pusher dog such as 48a engages driving dog 50, and that rapid (nearly instantaneous) deceleration occurs when the leading trolley 28 accumulates behind another trolley train or strikes a stop. Accumulation is illustrated at the left end of FIG. 1 where it may be seen that leading trolley 28' of the next train has engaged the trailing load trolley 44. Without the shock-absorbing action of the tow bar 32', this accumulation function would cause a high shock loading to be transmitted to the conveyor components, the product carrier and the product itself.

Having thus described the invention, what is claimed as new and desired to be secured by Letters Patent is:

1. In combination with a leading component and a trailing, load-supporting component of a product conveyor, a shock-absorbing tow bar responsive to acceleration or deceleration of the conveyor, said tow bar comprising:

an elongated, tubular member having a resilient material therein of predetermined radial thickness presenting a longitudinal passage having a substantially uniform, normal transverse dimension, a plunger in said passage shiftable longitudinally of the passage, a rod member connected to said plunger, shiftable therewith and extending longitudinally from said tubular member at one end of the tubular member, means for connecting said members to said leading and trailing components respectively to connect the tow bar to the conveyor and cause relative longitudinal movement of the members and lengthening or shortening of the tow bar in response to acceleration or deceleration, respectively, of the conveyor, and said plunger having a head in said passage of greater size than said transverse dimension to compress and displace said material at a zone of contact of the head with the material and cause the displaced material to form a pair of spaced, radially inwardly projecting, leading and following ridges of the material in contact with the head at said zone, said head shifting said zone of contact and compressing and displacing said material to shift said ridges in response to said relative longitudinal movement, whereby impact communicated to said tow bar shifts the plunger against the resistance of the resilient material to lengthen or shorten the tow bar and thereby absorb the shock.

2. The combination as claimed in claim 1, wherein said tubular member has a sleeve of said resilient material therein, said sleeve defining said passage and having an uncompressed inside diameter presenting said transverse dimension.

3. The combination as claimed in claim 2, wherein said tubular member and said sleeve have complimentary internal and peripheral surfaces respectively, said tow bar further comprising means uniting said tubular member and said sleeve at said complimentary surfaces.

4. The combination as claimed in claim 2, wherein said head has a generally spherical configuration.

5. The combination as claimed in claim 1, further comprising a pair of spaced end stops of resilient material in said tubular member at respective ends of said passage.

6. The combination as claimed in claim 1, further comprising a protective sleeve receiving said plunger rod member and movable therewith to shield the rod member from contaminants.

7. The combination as claimed in claim 6, further comprising bushing means on said one end of the tubular member, said sleeve being telescoped over said bushing means and slidably supported by said bushing means.

8. The combination as claimed in claim 7, wherein said bushing means has an opening therethrough receiving said rod member and providing a guide for said rod member.

9. In combination with an accumulating trolley and a load-supporting carrier of a power and free conveyor, a shock-absorbing tow bar responsive to acceleration or deceleration of the conveyor, said tow bar comprising:

an elongated, tubular member having a resilient material therein of predetermined redial thickness presenting a longitudinal passage having a substantially uniform, normal transverse dimension, a plunger in said passage shiftable longitudinally of the passage, a rod member connected to said plunger, shiftable therewith and extending longitudinally from said tubular member at one end of the tubular member, means for connecting said members to said accumulating trolley and carrier respectively to connect the tow bar to the conveyor and cause relative longitudinal movement of the members and lengthening or shortening of the tow bar in response to acceleration or deceleration, respectively, of the conveyor, and said plunger having a head in said passage of greater size than said transverse dimension to compress and displace said material at zone of contact of the head with the material and cause the displaced material to form a pair of spaced, radially inwardly projecting, leading and following ridges of the material in contact with the head at said zone, said head shifting said zone of contact and compressing and displacing said material to shift said ridges in response to said relative longitudinal movement, whereby impact communicated to said tow bar shifts the plunger against the resistance of the resilient material to lengthen or shorten the tow bar and thereby absorb the shock.

10. The combination as claimed in claim 9, wherein said tubular member has a sleeve of said resilient material therein, said sleeve defining said passage and having an uncompressed inside diameter presenting said transverse dimension.

11. The combination as claimed in claim 10, wherein said tubular member and said sleeve have complimentary internal and peripheral surfaces respectively, said combination further comprising means uniting said tubular member and said sleeve at said complimentary surfaces.

12. The combination as claimed in claim 10, wherein said head has a generally spherical configuration.

13. The combination as claimed in claim 9, further comprising a pair of spaced end stops of resilient material in said tubular member at respective ends of said passage.

14. The combination as claimed in claim 9, further comprising a protective sleeve receiving said plunger rod member and movable therewith to shield the rod member from contaminants.

15. The combination as claimed in claim 14, further comprising bushing means on said one end of the tubular member, said sleeve being telescoped over said bushing means and slidably supported by said bushing means.

16. The combination as claimed in claim 15, wherein said bushing means has an opening therethrough receiving said rod member and providing a guide for said rod member.

* * * * *